(12) United States Patent
Hong et al.

(10) Patent No.: US 6,372,020 B2
(45) Date of Patent: *Apr. 16, 2002

(54) OXYGEN ENRICHING MEMBRANE

(75) Inventors: Jae-Jin Hong, Misung Apt. #21-805, Apgoojeong-dong, Kangnam-ku, Seoul 135-110; Jae-Kun Yang, Joogong Apt. #606-1405, Gaepo-dong, Kangnam-ku, Seoul 135-240; Jeong-Ryeon Han, Seoul, all of (KR)

(73) Assignees: Jae-Jin Hong; Jae-Kun Yang; Joong-Ryeon Han, all of Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/383,346

(22) Filed: Aug. 26, 1999

(51) Int. Cl.⁷ ............................ B01D 53/22; B01D 71/04
(52) U.S. Cl. .................................................. 95/54; 96/4
(58) Field of Search ............................. 95/45, 54; 96/4, 96/12–14

(56) References Cited

U.S. PATENT DOCUMENTS

| | | | | |
|---|---|---|---|---|
| 2,540,151 | A | * 2/1951 | Weller et al. | 95/54 |
| 4,243,701 | A | 1/1981 | Riley et al. | 427/244 |
| 4,428,776 | A | * 1/1984 | Li | 96/4 X |
| 4,707,267 | A | * 11/1987 | Johnson | 95/54 X |
| 4,859,215 | A | * 8/1989 | Langsam et al. | 95/54 X |
| 4,871,378 | A | * 10/1989 | Pinnau | 95/54 X |
| 4,877,528 | A | * 10/1989 | Friesen et al. | 96/4 X |
| 5,061,301 | A | * 10/1991 | Kim et al. | 95/54 X |
| 5,286,280 | A | * 2/1994 | Chiou | 95/45 |
| 5,453,298 | A | * 9/1995 | Gavalas et al. | 96/12 X |

FOREIGN PATENT DOCUMENTS

| | | | | |
|---|---|---|---|---|
| JP | 53-025839 | B | * 7/1978 | 95/45 |
| JP | 59-225704 | A | * 12/1984 | 96/12 |
| JP | 60-238352 | A | * 11/1985 | 96/4 |
| JP | 01-281119 | A | * 11/1989 | 96/12 |
| JP | 02-144131 | A | * 6/1990 | 95/45 |
| JP | 02-307805 | A | * 12/1990 | 96/4 |
| SU | 1769939 | A1 | * 10/1992 | 96/4 |

OTHER PUBLICATIONS

Hayakawa et al., "Synthesis of Poly(phenylacetylene)s Containing Trifluoromethyl Groups for Gas Permeable Membrane", *Journal of Polymer Science: Part A. Polymer Chemistry*, vol. 30, pp. 873–877, (1992).

Kawakami et al., "Polystyrenes with Structurally Different Oligosiloxanes as p–Substituents for Oxygen Permeable Membrane Materials", *Journal of Polymer Science: Part A. Polymer Chemistry*, vol. 25, pp. 3191–3204 (1987).

Muruganandam et al., "Evaluation of Substituted Polycarbonates and a Blend with Polystyrene as Gas Separation Membranes", *Journal of Membrane Science*, 34 pp. 185–198 (1987).

Ward et al., "Ultrathin Silicone/Polycarbonate Membranes for Gas Separation Processes", *Journal of Membrane Science*, 1 pp. 99–108, (1976).

* cited by examiner

Primary Examiner—Robert H. Spitzer

(57) ABSTRACT

The present invention relates to a novel oxygen enriching membrane wich exhibits the desired oxygen selectivity and permeability under a low pressure difference characterized in that it is prepared from siloxylated cellulose and/or siloxylated glass.

8 Claims, 1 Drawing Sheet

Low Pressure (Non-porous)   High Pressure (Porous)

OXYGEN ENRICHING MEMBRANE

TECHNICAL FIELD

The present invention relates to a novel oxygen enriching membrane which exhibits the desired oxygen selectivity and permeability under a low pressure difference characterized in that it is prepared from siloxylated cellulose and/or siloxylated glass.

BACKGROUND ART

The air we breathe consists of about 20.9% of oxygen and about 78.1% of nitrogen. We call the membrane through which oxygen passes more selectively than the other gases as oxygen enriching membrane. Oxygen enriched air produced by the membrane elevates the efficiency of internal-combustion engine of car, which results in saving of energy, and further it may be widely used in the area of medical care, oxidizing procedure and environmental engineering. In addition, enriched nitrogen obtained as a side product during the oxygen enriching process can be utilized efficiently in various industrial areas which require the nitrogen enriched condition.

The oxygen enriching membrane enables us to separate gas by a simple device, and thus we can use it conveniently without any restriction on the space or portability. Accordingly, the gas separation technique using a membrane has been highly improved since 1980. The membrane-separation method is rather inadequate for obtaining a large amount of oxygen in a high density than the cryogenic process. Recently, however, the membrane-separation method becomes the center of interest because it requires less energy for the separation.

Since Kammermeyer first applied silicone rubber in gas separation on 1957(see, K. Kammermeyer, *Ind. Eng. Chem.*, 49, 1685, 1957), it has been recognized that methyl-based polysiloxane has the best oxygen permeability than any kind of polymers until the appearance of polytrimethylsilylpropyne(see, R. L. Riley et al., U.S. Pat. No. 4,243,701). However, since the membrane can be more easily torn as it becomes thinner for the purpose of improving permeability, further researches were required. As a result of the researches, the oxygen enriching membrane which was made from a copolymer of siloxane and carbonate was identified to be strong, and thus, was commercialized first(see, W. J. Ward III, *J. Membrane Sci.*, 1, 99, 1976). Then, several methods, such as for example, a method of using a graft copolymer of styrene and dimethylsiloxane, a method of introducing amide groups into the main chain structure by using tetramethyldisiloxane and aliphatic dicarboxylic acid, a method of substituting various siloxane groups for para-position of polystyrene, etc. were approached from this point of view(see, Y. Kawakami, *J. Polym. Sci.*, Part A, 25, 1591, 1987).

Derivatives substituted by fluorine were also used as the material for preparing an oxygen enriching membrane because solubility of oxygen gas into the membrane becomes higher as the fluorine content increases. For example, Yoshio et al. prepared an oxygen enriching membrane having the oxygen selectivity against nitrogen of 2.1 from the synthetic poly(phenylacetylene) derivative in which trifluoromethyl group is attached to benzene ring(see, Y. Hayakawa, M. Nishida, T. Aoki, and H. Muramnatsu, *J. Polym. Sci.*, Part A, 30, 873, 1992), and Paul et al. prepared oxygen enriching membranes having oxygen selectivities against nitrogen of 6.37 and 7.47, respectively, from the synthetic tetra-halogenated polycarbonate produced by halogenating Bis-phenol A with chlorine, bromine, etc(see, D. R. Paul, *J. Membrane Sci.*, 34, 185, 1987).

However, in spite of the constant efforts as mentioned above, the existing techniques still have the problems that oxygen permeability is apt to decrease as oxygen selectivity against nitrogen increases and that the energy required to separate oxygen increases as the pressure difference which is the driving force of gas separation through membrane increases for a good permeability.

Thus, the present inventors have extensively studied to develop an oxygen enriching membrane which has a good strength and also has an excellent oxygen enriching ability under a low pressure difference. As a result, we have found that such a purpose can be splendidly accomplished by using siloxylated cellulose or siloxylated glass as the material for oxygen enriching membrane, and then completed the present invention.

DISCLOSURE OF THE INVENTION

Therefore, it is an object of the present invention to provide a novel oxygen enriching membrane which has an outstanding oxygen selectivity and permeability under a low pressure difference, and which is prepared from siloxylated cellulose and/or siloxylated glass.

BRIEF DESCRIPTION OF DRAWINGS

For a thorough understanding of the nature and objects of the invention, reference should be made to the following description taken in connection with the accompanying drawings in which.

DETAILED DESCRIPTION OF THE INVENTION

Figure 1:
FIG. 1 represents a presumed diagram to explain the response type of the siloxyl group attached to the surface depending on the pressure condition.
Figure 1:
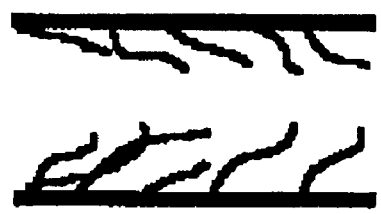
Figure 1:
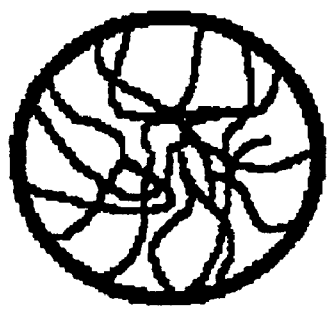
Figure 1:

The present invention relates to an oxygen enriching membrane which exhibits the desired oxygen selectivity and permeability under a low pressure difference characterized in that it is prepared from siloxylated cellulose and/or siloxylated glass.

In the present invention, cellulose and glass are selected as the solid substrate of the oxygen enriching membrane.

Cellulose is a kind of polysaccharide which functions as a scaffold of plants. It is a natural polymer having a molecular formula of $(C_6H_{10}O_5)_n$ (wherein n is between 2000 and 4000). Particularly, cellulose is strong and has an excellent resistance to weather. Also, it has the advantage that it can be chemically modified with ease, that is, the hydroxy groups therein can be easily siloxylated.

The glass which is a silicate of mono-, di-, or tri-valent metal also has free hydroxy groups or substituted hydroxy groups wherein hydrogen atoms are replaced with mono-valent metals such as sodium, potassium, etc. Therefore, it has an excellent strength and persistance, and may easily react with silane or siloxane compound. In the present invention, utility glasses which is easily obtainable from the ambient such as the conventional plate glass (soda ash glass), high refracting glass (lead glass), glass for physical and chemical apparatus (borosilicate glass, borosilicate alumina glass, borosilicate zinc glass) or other waste glass, etc. are used.

Siloxylation on the above solid substrate may be carried out using any known siloxylating agents such as silanes, siloxanes and silazanes having various substituents.

Particularly, in the present invention, one or more selected from the following compounds of formulae (1) to (3) are desirably used as the siloxylating agent.

The typical reaction types of solid substrates cellulose or glass with the siloxylating agents of formulae (1) to (3) are depicted in the following Reaction Schemes 1 to 6.

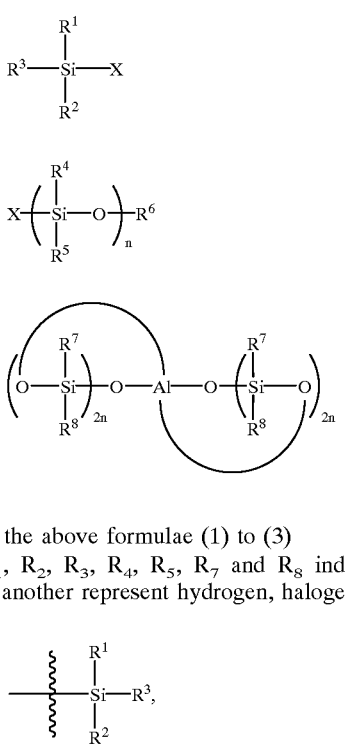

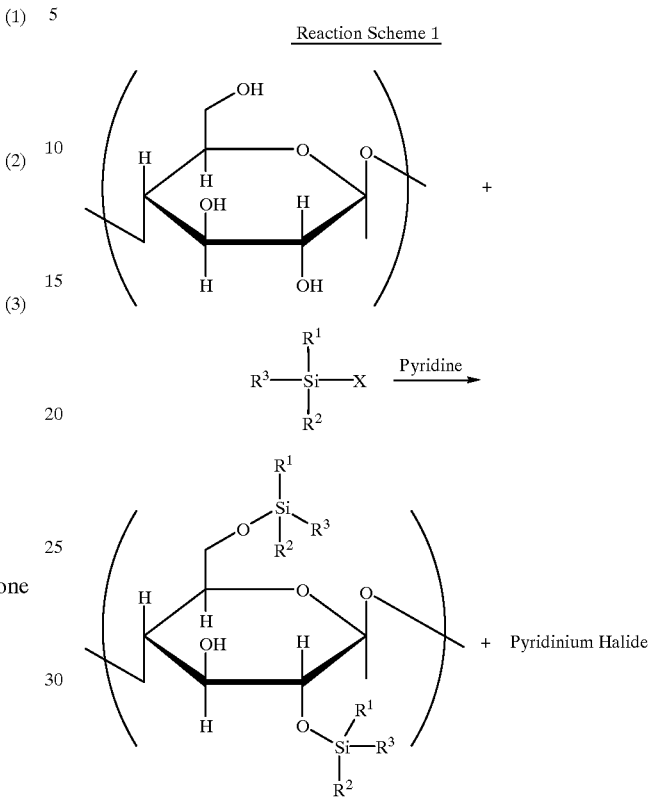

in the above formulae (1) to (3)

$R_1$, $R_2$, $R_3$, $R_4$, $R_5$, $R_7$ and $R_8$ independently of one another represent hydrogen, halogen or

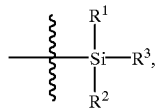

or represent $C_1$–$C_6$-alkyl, $C_2$–$C_6$-alkenyl or phenyl which is optionally substituted by one or more substituents selected from a group consisting of halogen and

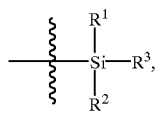

$R^6$ represents hydrogen or $C_1$–$C_6$-alkyl,

X represents hydrogen, halogen or amino substituted by

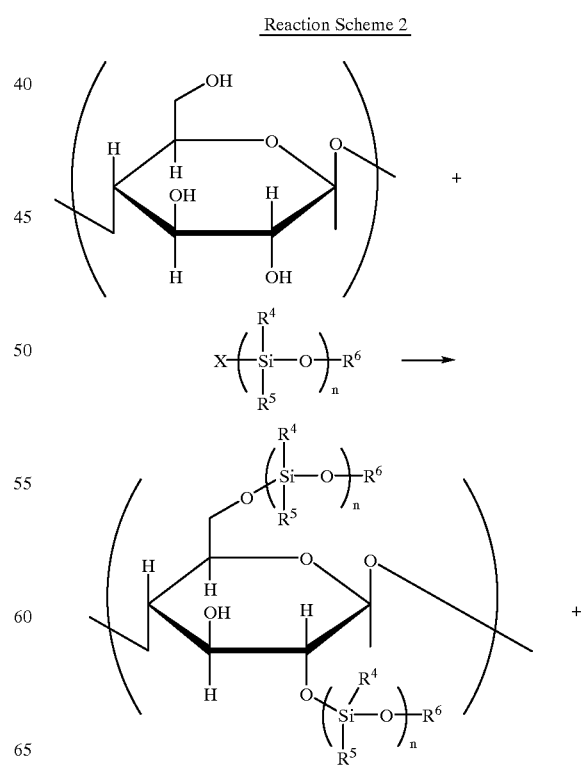

or represents OM' (wherein M' is alkali metal), and n denotes a number of 3 to 6.

The compound of formula (1) is mentioned in A, F. Reid and C. J. Wilkins, J. Chem. Soc., 4029, 1955, and may be prepared by the process disclosed in the same literature. The compound of formula (2) can be prepared by a process described in U.S. Pat. No. 5,892,087 which was filed by the present inventors. The compound of formula (3) is a novel compound developed by the present inventors and was filed as Korean Patent Application No. 99-18491. It can be easily prepared by the process described in the above patent literature and also the process is specifically represented in the following Preparation 1.

-continued

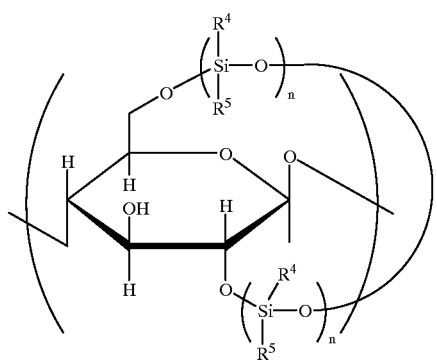
+ HX

Reaction Scheme 3

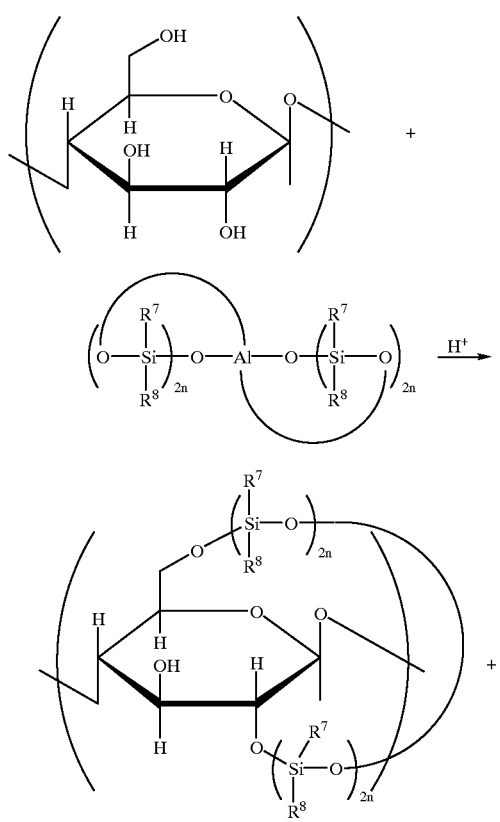
+ Al(OH)₃

Reaction Scheme 4

Glass-OM + R³—Si(R¹)(R²)—X  →  Glass-O—Si(R¹)(R²)—R³ + MX
   |                                  |
   OM                                 OM Reaction Scheme 5

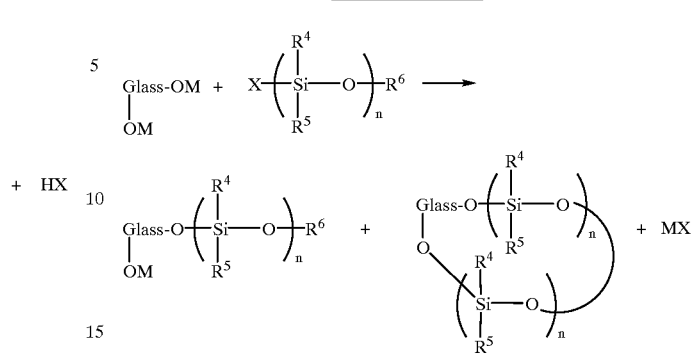

Reaction Scheme 6

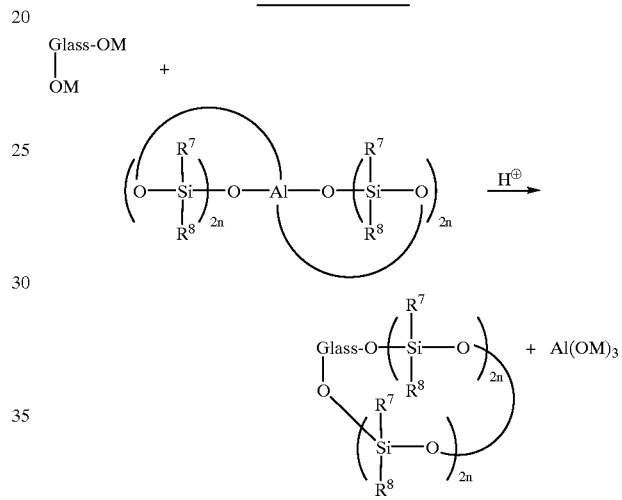

in the above reaction schemes 1 to 6
$R^1$ to $R^8$, X and n are defined as previously described, and M represents hydrogen or alkali metal.

Various siloxylcelluloses or siloxylglasses can be obtained by the processes as exemplified in the above reaction schemes 1 to 6. More specifically, the siloxylcellulose or siloxylglass according to the present invention may be obtained by a reaction with a siloxylating agent or with two or more siloxylating agents, for example, compounds of formulae (1) and (2), or compounds of formula (1) having different substituents from each other. Further, the siloxylating agent attached to the solid substrate in siloxylcellulose or siloxylglass may be secondarily modified by the compounds of formulae (1) to (3).

The oxygen enriching membrane prepared from the siloxylated solid substrate according to the present invention exhibits a superior oxygen permeability and selectivity to the earlier developed ones. This superiority is assumed due to the free motion of siloxyl groups located at the surface of solid substrate. That is, as depicted in FIG. 1, since the siloxyl groups are attached to the surface of solid substrate in the form as like a cilium, it swings according to the pressure difference which is caused by the permeated gas. Therefore, the oxygen enriching membrane appears to function as a non-porous membrane when the pressure difference is low, and function as a porous membrane when the pressure difference is high at which the siloxyl groups seem to slant to one side for making a larger pore. Particularly, when the compound of formula (2) or (3) is used as a siloxylating agent, the siloxyl groups may form a ring on the surface of substrate, but in this case the free motion of siloxyl group is also possible and thus the same effect can be obtained.

When cellulose is used as the substrate, the degree of substitution of hydroxy group is maximum 3. This is because there are three hydroxy groups per a unit molecule of cellulose. The siloxylcellulose having a degree of substitution of less than 1 may be used to prepare the oxygen enriching membrane, however, it is preferable to use the one having a degree of substitution of 1 or more. In order to make a siloxylcellulose having such a desirable degree of substitution, it may be required to use 2 to 10 times molar amount, preferably 9 times molar amount of siloxylating agent with respect to the glucose unit of cellulose in the siloxylation reaction. The common degree of substitution obtained from said reaction conditions ranges from 2.0 to 2.6.

It is better to activate cellulose before the siloxylation reaction. As an example of the activation, there can be mentioned a method wherein cellulose is finely smashed into pieces and then dipped in a solvent mixture of water and alcohol.

Siloxylation reaction is preferably carried out in the presence of a diluent. As the diluent, one or more selected from a group consisting of tetrahydrofuran, methanol, N,N-dimethylformamide(DMF), N,N-dimethylacetamide (DMAc) and DMAc/LiCl can be mentioned. Cellulose is usually present in a suspended state in most of the diluents as mentioned above, however, it is present in a dissolved state when DMAc/LiCl system is selected as the diluent. In such a dissolved state, a good degree of substitution may be obtained only with a small quantity of siloxylating agent. But, this system causes a problem that it is hard to isolate the resulting product after the reaction completion.

In case the compound of formula (1) is selected as the siloxylating agent, pyridine or liquid ammonia is used as an acid scavenger. Pyridine or liquid ammonia is added in the same molar amount or more with respect to the compound of formula (1) to form a salt by combining with the acid in the form of HX produced as a side product during the siloxylation reaction.

Glass is pulverized and distributed according to the size (mesh) in advance of the siloxylation reaction, and the glass powder having a size come within a certain range is used. The siloxylation of glass can be carried out in the same manner with that explained in relation to cellulose.

In preparing an oxygen enriching membrane from siloxylcellulose or siloxylglass, they may be used alone or as a mixture of one another. For example, the membrane can be prepared by dissolving the soluble siloxylcellulose in an organic solvent such as chloroform and then applying it alone to the membrane preparation(see, Examples 1 to 4); applying the binder siloxylcellulose dissolved in a solvent to the filler insoluble siloxylcellulose or siloxylglass to prepare the membrane(see, Examples 5 to 9); or making a membrane from glass powder using water glass($Na_2SiO_3$) as a binder and then passing siloxylcellulose dissolved in a solvent or a solution of siloxylating agent through the membrane(see, Examples 10 to 13). However, the methods for preparing an oxygen enriching membrane from the materials according to the present invention are not restricted to those as mentioned above, and any one which is generally used in the technical field to which the present invention pertains can be used.

Gas permeation test is carried out in order to determine the oxygen selectivity and permeability of the oxygen enriching membranes prepared. An apparatus manufactured by referring to P. K. Gantzel, Ind. Eng. Chem. Process Res. Dev., 9, 331, 1970 is used for that experiment which is conducted under a temperature ranging from 25 to 70° C. and a pressure ranging from 3.0 to 30 mmHg. In the present invention, the permeability is measured by a variable volume method from the gas flux established by the permeation of pure oxygen or nitrogen. Then, the oxygen selectivity against nitrogen[$\alpha(O_2/N_2)=P(O_2)/P(O_2)$] is determined from the respective oxygen and nitrogen permeability. In the variable volume method, the flux of permeated gas is measured in the state that the pressure difference is maintained constant by setting a specific pressure on the upper part of the membrane and by setting the atmospheric pressure on the lower part, and then the gas permeability is calculated from the flux.

An air (20.9% of oxygen, 78.1% of nitrogen) separation test is also carried out using the same apparatus in order to confirm the excellent property of the oxygen enriching membrane provided by the present invention. Herein, the permeated gas is analyzed by gas chromatography [detector: TCD (thermo conductivity detector), column: Molecular seive 5A].

The results of gas permeation test carried out on the oxygen enriching membranes prepared in the following examples and on the known ones are represented in the following tables 1 and 2. Oxygen permeability and selectivity obtained from the test wherein pure oxygen and nitrogen are passed through the membranes are shown in Table 1, and the results of air separation test are shown in Table 2.

TABLE 1

| Oxygen enriching membrane | Oxygen Permeability (Barrer) | Oxygen Selectivity [$P(O_2)/P(N_2)$] |
| --- | --- | --- |
| Dimethylsilicone rubber(a) | 500 | 2.2 |
| Poly(1-trimethylsilyl)-1-propyne(b) | 4000 | 2.0 |
| Silicone polycarbonate copolymer(c) | 160 | 2.9 |
| Cellulose acetate(d) | 0.8 | 3.0 |
| Nylon 6(e) | 0.04 | 2.8 |
| Example 1 | 14000 | 4.3 |
| Example 2 | 39300 | 8.7 |
| Example 3 | 10600 | 6.8 |
| Example 4 | 28400 | 6.0 |
| Example 5 | 11000 | 4.2 |
| Example 6 | 10200 | 3.3 |
| Example 7 | 23200 | 1.4 |
| Example 8 | 22100 | 2.2 |
| Example 9 | 16000 | 3.1 |
| Example 10 | 18000 | 2.5 |
| Example 11 | 17500 | 2.4 |
| Example 12 | 15000 | 3.2 |
| Example 13 | 24000 | 1.2 |

(Note) In table 1, the oxygen enriching membranes of (a) and (c) to (e) are disclosed in R. L. Riley et al., U.S. Pat. No. 4,243,701 & M. Mulder, Basic Principles of membrane Technology, p32, 1991, and the oxygen enriching membrane of (b) is disclosed in K. Takada et al., J. Appl. Polym. Sci., 30, 1605, 1985 & M. Mulder, Basic Principles of membrane Technology, p32, 1991.

TABLE 2

| Example No. | Oxygen % | Nitrogen % |
| --- | --- | --- |
| 1 | 46.121 | 53.879 |
| 2 | 63.568 | 36.432 |

TABLE 2-continued

| Example No. | Oxygen % | Nitrogen % |
|---|---|---|
| 3 | 55.984 | 44.016 |
| 4 | 52.236 | 47.764 |
| 5 | 44.753 | 55.247 |
| 6 | 42.124 | 57.876 |
| 7 | 23.825 | 76.175 |
| 8 | 25.126 | 74.874 |
| 9 | 35.984 | 64.016 |
| 10 | 32.112 | 67.888 |
| 11 | 25.484 | 74.516 |
| 12 | 38.556 | 61.444 |
| 13 | 22.256 | 77.744 |

As can be seen from the result of table 1, the oxygen enriching membranes made from siloxylcellulose or siloxylglass according to the present invention exhibit a highly improved oxygen permeability compared with the existing oxygen enriching membranes, and their oxygen selectivity against nitrogen determined at such an improved permeability is also very excellent. Particularly, it should be noted that such excellent permeability and selectivity are obtained under a low pressure differences ranging from 3 to 30 mmHg. That is, a small quantity of energy is required when the oxygen enriching membrane of the present invention is applied since it functions well under a low pressure difference, nevertheless, it's oxygen enriching ability is still more improved than that of the existing oxygen enriching membrane.

Generally, non-porous membranes such as synthetic polymer membranes show a low oxygen permeability, but a good oxygen selectivity. To the contrary, porous membranes show a more improved permeability than the non-porous membranes, but a poor oxygen selectivity. Particularly, the oxygen selectivity from the mixture of oxygen gas and nitrogen gas which have similar molecule sizes from each other cannot but lower. However, the oxygen enriching membrane of the present invention shows a potent effect on both the oxygen permeability and oxygen selectivity against nitrogen, which appears to be caused by the free motion of siloxyl groups as aforementioned.

While, it can be recognized from table 2 that the oxygen enriched air can be obtained by passing the air through the oxygen enriching membrane according to the present invention, and particularly the air wherein oxygen is enriched to 40% or more can be obtained when a membrane prepared from siloxylcellulose is used. Therefore, an increase of efficiency may be expected when the oxygen enriching membrane of the present invention is applied to portable oxygen-mask or internal-combustion engine of car, and accordingly the present invented membrane is very suitable for industrial use. Also, since the oxygen enriching membrane of the present invention represents various degrees of oxygen enrichment according to the composition or the preparation process, it has the additional advantage that it may be properly selected and used depending on the required oxygen content.

The present invention will be more specifically explained in the following examples. However, it should be understood that the following examples are intended to illustrate the present invention but not in any manner to limit the scope of the present invention.

EXAMPLE 1

Cellulose(Whatman Ch#1 paper) was finely smashed into pieces and then dipped in $H_2O/EtOH(1:1, v/v)$ at room temperature for 48 hours. Again, it was dipped in $H_2O/EtOH$ (1:3, v/v) at room temperature for 24 hours, and finally dipped in 100% EtOH at room temperature for 3 hours and then dried under a condition of 100° C./20 mmHg for 15 hours.

50 ml of pyridine was added to 1 g of the cellulose thus activated, the resulting mixture was refluxed for 24 hours and then cooled down to room temperature. 30 ml of tetrahydrofuran was added thereto and trimethylchlorosilane was added dropwise over 30 minutes in 9 times molar amount with respect to the glucose unit. After the addition of siloxylating agent, 10 ml of tetrahydrofuran was further added and the mixture was stirred at room temperature for 10 hours. Tetrahydrofuran was added portionwise to the reaction mixture in order to decrease the viscosity which is gradually increased with the lapse of time. After 10 hours, 100 ml of methanol was added and the resulting mixture was stirred over 1 hour. Then, the solid component was taken, washed several times with methanol, and dried under vacuum to give 2.1 g(1.1 g increase, 110% siloxylation) of trimethylsiloxylcellulose.

The trimethylsiloxylcellulose thus obtained was dissolved in chloroform and then filtered through a glass filter. The filtrate was recrystallized from methanol and dried under vacuum to be used as a sample for NMR and IR analysis. The siloxylated cellulose thus purified was dried under a condition of 100° C./20 mmHg for 10 hours and then used as a sample for elementary analysis of carbon and hydrogen. Here, the elementary analysis of carbon and hydrogen is carried out for calculating the degree of substitution.

$^1$H NMR(CDCl$_3$, ppm): δ0.1(s, Si—CH$_3$) IR(cm$^{-1}$): 2900 (C—H), 1100(Si—O), 1200, 900(Si—C), 3500(O—H)

Elementary Analysis: C(44.1%), H(7.9%) Degree of Substitution: 2.5

The permeation test on trimethylsiloxylcellulose as prepared above was performed as follows. 4 ml of 0.5%(w/v) chloroform solution of trimethylsiloxylcellulose was introduced into a petri dish having a diameter of 60 mm and then casted in a desiccator under room temperature for 24 hours. The membrane thus prepared has a thickness of 45~50 μm and an available area of 2.41 cm$^2$. The gas permeation test was carried out by referring to P. K. Gantzel, Ind. Eng. Chem. Process Res. Dev., 9, 331, 1970, and the temperature and pressure conditions during which were 25° C. and 3 mmHg, respectively. The permeabilities of pure nitrogen and oxygen were determined by the variable volume method. Also, the oxygen selectivity against nitrogen[α=P (O$_2$)/P(N$_2$)] was calculated from oxygen and nitrogen permeabilities and the results are represented below.

Oxygen Permeability: 14,000 Barrer

Oxygen Selectivity against Nitrogen: 4.3

The air (20.9% of oxygen, 78.1% of nitrogen) separation test was carried out using the same apparatus and method as above, and the permeated gas content was analyzed by G.C.[detector: TCD(thermo conductivity detector); column: Molecular seive 5A]. The result of G.C. analysis is shown in the above table 2.

EXAMPLE 2

Vinyldimethylsiloxylcellulose was prepared according to the same procedure as Example 1 except that vinyldimethylchlorosilane was used instead of trimethylchlorosilane. Then, gas permeation test was carried out in the same manner as Example 1 to determine oxygen permeability and oxygen selectivity against nitrogen.

$^1$H NMR(CDCl$_3$, ppm): δ0.1(s, Si—CH$_3$), 5.9(m, Si—CH=CH$_2$) IR(cm$^{-1}$): 3050(C—H, unsaturated), 1100(Si—O), 1200, 900(Si—C)

Elementary Analysis: C(51.5%), H(8.0%) Degree of Substitution: 2.2 Oxygen Permeability: 39,300 Barrer Oxygen Selectivity against Nitrogen: 8.7

EXAMPLE 3

3,3,3-Trifluoropropyldimethylsiloxylcellulose was prepared according to the same procedure as Example 1 except that 3,3,3-trifluoropropyl-dimethylchlorosilane was used instead of trimethylchlorosilane. Then, gas permeation test was carried out in the same manner as Example 1 to determine oxygen permeability and oxygen selectivity against nitrogen.

$^1$H NMR(CDCl$_3$, ppm): δ0.169(s, Si—CH$_3$), 0.812(s, Si—CH$_2$), 2.048(s, CF$_3$—CH$_2$—) IR(cm$^{-1}$): 2900(C—H), 1100(Si—O), 1200, 900(Si—C), 3500(O—H)

Elementary Analysis: C(54.1%), H(7.9%) Degree of Substitution: 2.6 Oxygen Permeability: 10,600 Barrer Oxygen Selectivity against Nitrogen: 6.8

EXAMPLE 4

Allyldimethylsiloxylcellulose was prepared according to the same procedure as Example 1 except that allyldimethylchlorosilane was used instead of trimethylchlorosilane. Then, gas permeation test was carried out in the same manner as Example 1 to determine oxygen permeability and oxygen selectivity against nitrogen.

$^1$H NMR(CDCl$_3$, ppm): δ0.1(s, Si—CH$_3$), 4.9(s, Si—CH$_2$), 5.8(s, C—H), 7.2(s, =CH$_2$) IR(cm$^{-1}$): 1200, 900(Si—C), 3100(unsaturated C—H), 3500(O—H)

Elementary Analysis: C(54.1%), H(8.5%) Degree of Substitution: 2.1 Oxygen Permeability: 28,400 Barrer Oxygen Selectivity against Nitrogen: 6.0

EXAMPLE 5

2 g of the cellulose activated in the same manner as Example 1 was introduced into a 200 ml volume three neck flask. The decomposition product of silicone rubber prepared in Example 4 of U.S. Pat. No. 5,892,087(average molecular weight: 360) was dissolved in isopropyl alcohol in a concentration of 30% by weight, and then 20 ml thereof was added to the flask. 50 ml of methanol was added and the resulting mixture was stirred for 3 hours under heating and reflux. The solid in the lower part of the flask was taken and air-dried. This dried solid was heat-treated for 1 hour in an oven of 130~135° C. and then cooled down. The solid was then washed three times with distilled water, washed twice with acetone, dried for 1 hour in a vacuum oven(40° C., 40 mmHg) and dried for 1 hour at 110° C. to give 2.45 g(0.45 g increase, 22% siloxylation) of insoluble siloxylcellulose.

1 g of the siloxylcellulose obtained in above was added to a mold having an inner diameter of 2 cm with 4% chloroform solution of trimethylsiloxylcellulose prepared in Example 1, which was then pressed to produce a shape having an outer diameter of 2 cm and a thickness of 1.5 mm. This molded product was dried for 1 hour in a vacuum oven and introduced again into the above mold to be pressed in a pressure of 10 kg. Then, the resulting membrane was applied to gas permeation test in the same manner as Example 1.

Oxygen Permeability: 11,000 Barrer
Oxygen Selectivity against Nitrogen: 4.2

Preparation 1
(Step 1)
100 ml of siloxane alkali metal salt

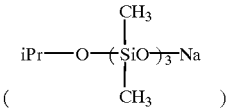

which had been concentrated to 50% of siloxane content was introduced into a 1 l volume three neck flask, 4 g of sodium aluminate(NaOAlO), 30 ml of distilled water and 50 ml of isopropyl alcohol were added thereto, and the reaction mixture was severely stirred at room temperature for 3 hours. Under continuous stirring, the mixture was heated for 1 hour at 40° C. and for 1 hour at 60° C. The reaction was proceeded until a light brown and clear liquid was produced. 30 ml of said siloxane alkali metal salt concentrated to 50% of siloxane content was added thereto, and the resulting mixture was stirred continuously until it was cooled down to room temperature in order to give a light brown and clear liquid substance(water-soluble aluminosiloxane metal salt).

(Step 2)
20 ml of ammonia water (28%) was added to the clear liquid produced in Step 1 and the mixture was stirred for 2 hours at room temperature. Then, conc hydrochloric acid was slowly added dropwise thereto in order to adjust the pH to 7.5 while the reaction solution was stirred continuously. The mixture was then stirred for 1 hour at 60° C. and cooled down to room temperature. 100 ml of n-hexane was added, and the resulting mixture was stirred for 30 minutes and allowed to stand. Then, the clear liquid of upper layer was taken by using separatory funnel. The liquid of lower layer remained after removing the upper layer was extracted with n-hexane, this extract was combined with the liquid of upper layer, and then it was washed with distilled water. The solvent was removed by rotary evaporator to give an oil-soluble aluminosiloxane compound.

(Step 3)
The compound prepared in Step 2 was poured into a 500 ml volume beaker and concentrated by heating to 150° C. Then, it was cooled down to give 60 g of aluminosiloxane compound as a concentrate in the gel form. The concentrate thus obtained was dissolved in 300 ml of n-hexane, 3 g (the same molar amount with alkali metal, which was identified by elementary analysis) of ammonium chloride was added thereto, and the mixture was stirred at room temperature for 4 hours. Then, the liquid of upper layer was taken by using separatory funnel, treated with rotary evaporator and heated to 150° C. to remove the solvent, whereby 59 g of the aluminosiloxane compound of formula (3)(R$^7$, R$^8$=methyl, n=3; molecular weight 1000) was obtained.

EXAMPLE 6

2 g of the cellulose activated in the same manner as Example 1 was introduced into a 200 ml volume three neck flask. 1 g of the aluminosiloxane compound(molecular weight 1000) prepared in Preparation 1 was dissolved in 50 ml of tetrahydrofuran. This solution was introduced into the above flask and the resulting mixture was acidified to pH 6 using formic acid. The mixture in the flask was stirred under reflux for 1 hour and the solvent was removed. The residue was air-dried overnight, heat-treated for 1 hour in an oven controlled to 130~135° C., and washed sequentially once with distilled water and twice with acetone. Then, the solid thus obtained was dried for 3 hours in a vacuum oven(40° C., 40 mmHg) and dried for further 2 hours in an oven(110° C.) to give 2.5 g(0.5 g increase, 25% siloxylation) of insoluble siloxylcellulose.

A membrane was prepared from the above siloxylcellulose in the same procedure as Example 5, and then gas permeation test was carried out in the same manner as Example 1 to determine oxygen permeability and oxygen selectivity against nitrogen.

Oxygen Permeability: 10,200 Barrer

Oxygen Selectivity against Nitrogen: 3.3

EXAMPLE 7

The waste common glass(soda ash glass: $Na_2O$ 10~20%, CaO 5~15%, $Al_2O_3$ 0.5~4%, $SiO_2$ 65~70%) was pulverized and distributed according to size by 100, 150, 200, 250, 325 and 400 mesh seives. Each glass powder having the size of 100–150 mesh, 150–200 mesh, 200–250 mesh, 250–325 mesh and 325–400 mesh, respectively, was combined and washed with water and dried at 110° C. to be used as the starting material for siloxylation.

10 g of the glass powder of 325–400 mesh was introduced into a 200 ml volume Erlenmeyer flask, 50 ml of trimethylchlorosilane in 100 ml of n-hexane was added thereto, and the mixture was stirred at room temperature for 1 hour. Only the glass powder settled down to the bottom was taken, allowed to stand in air for 5 hours, heat-treated in an oven controlled to 130° C. for 30 minutes and then cooled. The powder was then sequentially washed with distilled water and acetone and dried in an oven of 110° C. for 1 hour to give 11.9 g(1.9 g increase, 19% siloxylation) of trimethylsiloxylglass.

0.2 g of trimethylsiloxylglass as obtained above was mixed with 5 ml of 4% chloroform solution of trimethylsiloxylcellulose prepared in Example 1. Chloroform was evaporated to prepare a membrane of siloxylcellulose containing siloxylglass. Then, gas permeation test was carried out in the same manner as Example 1.

Oxygen Permeability: 23,200 Barrer

Oxygen Selectivity against Nitrogen: 1.4

EXAMPLE 8

10 g of the glass powder of 325–400 mesh was introduced into a 200 ml volume Erlenmeyer flask. The decomposition product of silicone rubber prepared in Example 4 of U.S. Pat. No. 5,892,087(average molecular weight: 360) was dissolved in isopropyl alcohol in a concentration of 30% by weight, and then 20 ml thereof was dissolved in 100 ml of methanol. 100 ml of this solution was taken and added to the above glass powder. The resulting mixture was stirred under reflux for 1 hour and cooled down to room temperature. Only the solid in the lower layer was taken, allowed to stand in air overnight, heat-treated in an oven controlled to 130~135° C. for 1 hour, and then cooled down to room temperature. The solid was then washed three times with distilled water and twice with acetone, dried for 2 hours in a vacuum oven(40° C., 40 mmHg) and dried for further 2 hours in an oven(110° C.) to give 13 g(3 g increase, 30% siloxylation) of siloxylglass.

A membrane was prepared from the siloxylglass as obtained above according to the same procedure as Example 7. Then, gas permeation test was carried out in the same manner as Example 1.

Oxygen Permeability: 22,100 Barrer

Oxygen Selectivity against Nitrogen: 2.2

EXAMPLE 9

10 g of the glass powder of 325–400 mesh was introduced into a 200 ml volume Erlenmeyer flask. 5 g of the aluminosiloxane(molecular weight 1000) prepared in Preparation 1 was dissolved in 100 ml of tetrahydrofuran and added to the above flask. The mixture in the flask was acidified to pH 6 using formic acid. The mixture was stirred under reflux for 2 hours and allowed to stand for 1 hour. Only the solid in the lower layer was taken, dried in air overnight, heat-treated in an oven controlled to 130° C., and then cooled. The solid was then washed three times with distilled water and twice with acetone, dried for 2 hours in a vacuum oven(40° C., 40 mmHg) and dried for further 2 hours in an oven(110° C.) to give 13.2 g(3.2 g increase, 31% siloxylation) of siloxylglass.

A membrane was prepared from the siloxylglass as obtained above according to the same procedure as Example 7. Then, gas permeation test was carried out in the same manner as Example 1.

Oxygen Permeability: 16,000 Barrer

Oxygen Selectivity against Nitrogen: 3.1

EXAMPLE 10

(Step 1)

100 g of the glass powder of 100–150 mesh was mixed with 20 g of the glass powder of 200–250 mesh. 10 g of the mixed powder was added to 2 ml of 10% aqueous water glass($Na_2SiO_3$) solution, which was then well kneaded. The kneaded material was introduced into a mold having an inner diameter of 2 cm, pressed in a pressure of 10 kg, and then dried in air overnight. The molded product was heated in an electric furnace at a temperature of 350~400° C. for 1 hour to produce a glass membrane having a thickness of 4 mm.

(Step 2)

The glass membrane as prepared above was placed in a suction apparatus, 4% chloroform solution of trimethylsiloxylcellulose prepared in Example 1 was passed through the membrane for 30 minutes, and then dried. After this membrane was further dried in an oven of 110° C. for 1 hour, gas permeation test was carried out in the same manner as Example 1.

Oxygen Permeability: 18,000 Barrer

Oxygen Selectivity against Nitrogen: 2.5

EXAMPLE 11

The glass membrane prepared in Step 1 of Example 10 was placed in a suction apparatus. The decomposition product of silicone rubber prepared in Example 4 of U.S. Pat. No. 5,892,087(average molecular weight: 360) was dissolved in isopropyl alcohol in a concentration of 30% by weight and then 20 ml thereof was dissolved in 100 ml of isopropyl alcohol. This solution was passed through said membrane for 30 minutes. Then, the membrane was air-dried overnight, heat-treated in an oven of 130° C. for 2 hours, cooled down to room temperature and dried in an oven of 110° C. for 2 hours. Gas permeation test was carried out in the same manner as Example 1.

Oxygen Permeability: 17,500 Barrer

Oxygen Selectivity against Nitrogen: 2.4

EXAMPLE 12

The glass membrane prepared in Step 1 of Example 10 was placed in a suction apparatus. 10 ml of 50% aqueous formic acid solution was passed through the membrane first, and then 100 ml of tetrahydrofuran solution in which 5 g of the aluminosiloxane compound (molecular weight 1000) prepared in Preparation 1 was dissolved was passed for 30 minutes. Then, the membrane was air-dried overnight, heat-treated in an oven of 130° C. for 3 hours, and cooled down to room temperature. The membrane thus prepared was placed in said suction apparatus, washed with 100 ml of distilled water, and dried in an oven of 110° C. for 2 hours. Gas permeation test was carried out in the same manner as Example 1.

Oxygen Permeability: 15,000 Barrer

Oxygen Selectivity against Nitrogen: 3.2

EXAMPLE 13

The glass membrane prepared in Step 1 of Example 10 was placed in a suction apparatus. A 4% tetrahydrofuran solution of trimethylchlorosilane was passed through the membrane for 30 minutes. Then, the membrane was dried and heat-treated in an oven of 130° C. for 1 hour. The membrane thus prepared was placed again in said suction apparatus, washed with distilled water for 10 minutes, air-dried overnight, and then dried in an oven of 110° C. for 2 hours. Gas permeation test was carried out in the same manner as Example 1.

Oxygen Permeability: 24,000 Barrer

Oxygen Selectivity against Nitrogen: 1.2

What is claimed is:

1. A method for providing an oxygen-enriched gas sample comprising:

providing an oxygen enriching membrane comprising siloxylated glass; and passing through the membrane a gas that contains oxygen;

wherein the membrane which exhibits oxygen selectivity and permeability under a low pressure difference of 3 to 30 mm Hg.

2. A method of claim 1 wherein air is passed through the membrane.

3. A method of claim 1 wherein the oxygen enriching membrane gas that passes through the membrane is enriched in oxygen content.

4. An oxygen enriching membrane consisting of siloxylated glass.

5. An oxygen enriching membrane which comprises siloxylated glass and which exhibits oxygen selectivity and permeability under a low pressure difference of 3 to 30 mm Hg.

6. The membrane of claim 5 wherein the siloxylated glass is prepared by a siloxylation using one or more siloxylating agents from the compounds of the following formulae (1) to (3):

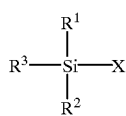
(1)

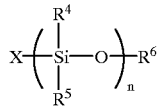
(2)

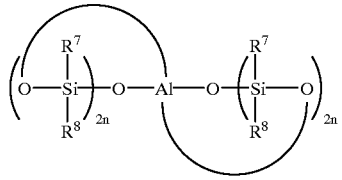
(3)

in the above formulae (1) to (3)

$R_1$, $R_2$, $R_3$, $R_4$, $R_5$, $R_7$ and $R_8$ independently of one another represent hydrogen, halogen or

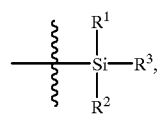

or represent $C_1$–$C_6$-alkyl, $C_2$–$C_6$-alkenyl or phenyl which is optionally substituted by one or more substituents selected from a group consisting of halogen and

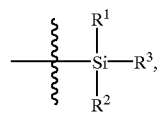

$R_6$ represent hydrogen or $C_1$–$C_6$-alkyl,

X represent hydrogen, halogen or amino substituted by

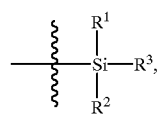

or represents OM' (wherein M' is alkali metal), and n denotes a number of 3 to 6.

7. The membrane of claim 5, wherein the membrane consists of siloxylated glass.

8. A process for preparing an oxygen enriching membrane, comprising:

providing a membrane formed from a glass powder using water glass ($Na_2SiO_3$) as a binder, and passing siloxylcellulose dissolved in a solvent or a solution of siloxylating agent through the membrane.

* * * * *